Patented Apr. 24, 1934

1,956,156

UNITED STATES PATENT OFFICE 1,956,156

METHOD OF MAKING POROUS RUBBER PRODUCTS

Evelyn William Madge and Albert Nelson Ward, Erdington, Birmingham, England, assignors to Dunlop Rubber Company, Limited, London, England, a British corporation No Drawing. Application December 28, 1932, Serial No. 649,151. In Great Britain January 29, 1932

5 Claims. (Cl. 18—53)

This invention comprises improvements in or relating to the manufacture of goods of or containing rubber or similar material by one or more operations such as molding, spreading, spraying or dipping, particularly on metallic or like surfaces from aqueous emulsions or dispersions of the kinds hereinafter specified.

The present invention is particularly concerned with the production of porous or micro-porous articles of vulcanized rubber or the like from aqueous emulsions or dispersions of the kinds hereinafter specified which are coagulated or gelled in any one or more operations such as molding, spreading, spraying, or dipping, and the products so obtained are thereafter vulcanized in known manner under such conditions that evaporation of the liquid contained in the pores or micro-pores of the aforesaid products is prevented.

The object of the present invention is to provide a method for the production of porous or micro-porous articles of vulcanized rubber or the like particularly of hard rubber and in particular battery separators or filtering diaphragms or cones free from surface markings.

The particular surface markings which are to be removed according to the present invention are those which show depressions on one side of a micro-porous article and on the other side of the article the exact contour of these depressions in relief.

According to the present invention the method for the manufacture of porous or micro-porous articles of vulcanized rubber or the like from aqueous emulsions or dispersions of the kinds hereinafter specified wherein the emulsions or dispersions aforesaid are coagulated or gelled in any one or more operations such as molding, spreading, spraying or dipping, and thereafter vulcanizing in known manner the products so obtained under such conditions that evaporation of the liquid contained in the pores or micro-pores of the product is prevented, comprises cooling, preferably sharply cooling, the product undergoing vulcanization part way through the vulcanization operation and preferably before any substantial formation of hard rubber or ebonite has taken place, and thereafter proceeding with the vulcanization operation to completion.

It is considered that the following may be a possible explanation of the effect of cooling the product undergoing vulcanization part way through the vulcanization operation and thereafter proceeding with the vulcanization operation to completion.

Owing to the high co-efficient of expansion of rubber as compared with metal it is thought that during the sharp cooling, the micro-porous rubber article contracting far more than the metal, detached itself completely from the mold plate. Any gases that have already been evolved are diminished in volume. On reheating such gases expand and are distributed uniformly between the micro-porous rubber article and the mold plate and any further gas that is evolved is also distributed uniformly between the rubber article and the mold plate. Thus no local marking occurs.

The emulsions or dispersions comprise those consisting of or containing rubber, gutta-percha, balata or similar vegetable resins occurring naturally or artificially obtained.

Such artificial dispersions may include those of coagulated rubber, vulcanized rubber, synthetic rubber, waste or reclaim. If desired any of the aforementioned dispersions may be used alone or in admixture with one another.

Any of the aforesaid dispersions may contain the usual known compounding ingredients and/or may be in concentrated form.

Concentrates such as are obtained in Patent 1,846,164, February 23, 1932 to which may be added any one or more of the usual compounding ingredients, may also be used.

The present invention has been found particularly useful in connection with the processes described and claimed in Patent 1,819,647 and British Patents 351,937 and 377,751.

The following example illustrates how the method can be effected for the production of micro-porous ebonite separators.

A latex mixing of the following compositions,—

| | Parts by weight |
|---|---|
| Rubber | 100 |
| Sulphur | 50 |
| Zinc oxide | 2 |
| Zinc oleate | 3 |
| Mineral oil | 10 |
| Lamp black | 2 | is prepared from a 60% rubber latex obtained by centrifugal action. The final alkalinity of the mixing is 0.15% expressed in terms of ammonia and the solid content 45% to 50%. This latex mixing is cooled to about 5° C. To 100 grams of this fluid mixing 3 ccs. of 25% ammonium sulphate also previously cooled are added and the resulting thin fluid is poured into a separator mold. After closing the mold and clamping, the mixing may be directly vulcanized, gelling taking place in the vulcanizing operation, or allowed to gel in hot water and subsequently vulcanized.

The vulcanization is made to take place while the mold is completely immersed in hot water and subjected to a steam pressure, care being taken that the mold is totally immersed during the vulcanization operation. The mold is placed in a container filled with water. The container is then put into an autoclave.

The steam pressure is allowed to rise to 80 pounds in 15 minutes, the pressure is kept at this value for 30 minutes, and then the temperature is allowed to fall to room temperature in 15 minutes, after which the pressure is again allowed to rise to 80 pounds steam pressure in 15 minutes and the pressure is kept at this value for 90 minutes.

The mold is then rapidly cooled before opening, and the separators produced are then rinsed and allowed to dry. A final rapid cooling is not essential but is desirable to reduce the time of working.

The method of effecting the rapid cooling of the mold is as follows:

As soon as the steam inlet is turned off in the autoclave cold water is injected through a tube from the outside of the autoclave which feeds into the container in which the mold is immersed. The water flows into this container as the steam is released so that by the time the steam pressure has been completely released the mold is practically cold. On readmitting the steam, the water is turned off and the temperature rises as before.

Having now particularly described and ascertained the nature of our said invention and in what manner the same is to be performed, we declare that what we claim is:—

1. A process for the manufacture of improved porous or micro-porous articles of vulcanized rubber or the like from aqueous dispersions which comprises gelling the dispersion and thereafter vulcanizing the gelled dispersion in contact with a forming surface under such conditions that evaporation of the liquid contained in the pores or micropores of the product is prevented, cooling the product undergoing vulcanization part way through the vulcanization operation and thereafter continuing the vulcanization to completion.

2. In a process of vulcanizing gelled aqueous dispersions of rubber on a mold surface the step of freeing the molded article from the mold surface by chilling the rubber during vulcanizing without permitting substantial loss of water from the dispersion.

3. A process of vulcanizing a rubber composition to form a hard rubber article which comprises molding a gelled dispersion of rubber composition into contact with a molding surface, heating said molded composition to a vulcanizing temperature while preventing escape of water therefrom, chilling said composition and reheating to a vulcanizing temperature.

4. A process of vulcanizing, while gelled, an aqueous dispersion of a compounded rubber to form a hard rubber composition which comprises molding said dispersion, heating said gelled dispersion under a steam pressure of eighty pounds per square inch for about thirty minutes while preventing escape of water therefrom, chilling said molded composition to room temperature and reheating under eighty pounds steam pressure for about ninety minutes.

5. A method of forming porous articles from rubber dispersions which comprises gelling a concentrated dispersion of rubber composition in a mold, heating said molded composition to a vulcanizing temperature for a time insufficient for complete vulcanization to hard rubber while preventing escape of water therefrom, chilling said heated composition to room temperature and again heating to vulcanizing temperature.

EVELYN WILLIAM MADGE.
ALBERT NELSON WARD.